United States Patent [19]

Wang et al.

[11] Patent Number: 4,697,261
[45] Date of Patent: Sep. 29, 1987

[54] LINEAR PREDICTIVE ECHO CANCELLER INTEGRATED WITH RELP VOCODER

[75] Inventors: David T. K. Wang; Philip J. Wilson, both of San Diego, Calif.

[73] Assignee: M/A-COM Government Systems, Inc., San Diego, Calif.

[21] Appl. No.: 904,551

[22] Filed: Sep. 5, 1986

[51] Int. Cl.$^4$ ............................................. H04B 3/20
[52] U.S. Cl. ................................... 370/32.1; 379/410; 381/29
[58] Field of Search ...................... 381/29, 31; 370/24, 370/32.1; 379/391, 392, 406, 410, 411; 455/63

[56] References Cited

U.S. PATENT DOCUMENTS 4,591,669 5/1986 Duttweiler et al. ................ 370/32.1
4,633,046 12/1986 Kitayama et al. .................... 379/411

OTHER PUBLICATIONS

M. Sondi and D. Berkley, "Silencing Echoes on the Telephone Network", Proc. IEEE, 1980, pp. 948–963.
S. Yamamoto et al., "An Adaptive Echo Canceller with Linear Predictor", Trans. IECE Japan, 1979, pp. 851–857.
K. Ochiai et al., "Echo Canceller with Two Echo Path Models", IEEE Trans. COM-25, 1977, pp. 589–595.
Gingell, "A Block Mode Update Echo Canceller Using Custom LSI", 1983 IEEE, pp. 1394–1397.

Primary Examiner—Benedict V. Safourek
Attorney, Agent, or Firm—Edward W. Callan

[57] ABSTRACT

A linear predictive echo canceller is integrated with a RELP vocoder in a two-way communications network, in which a received digitized speech signal synthesized by the RELP vocoder from a residual signal received with linear prediction coefficients is echoed onto a transmit channel and combined with a transmitted digitized speech input signal that is to be analyzed by a RELP vocoder for transmission. The echo canceller cancels the echoed signal from the transmit channel by generating a foreground transmit signal by subtracting a foreground estimate of the echoed signal from the combined signal; and providing the foreground transmit signal on the transmit channel for ananlysis by the RELP vocoder. In order to generate the foreground transmit signal, the echo canceller filters the received digitized speech signal with adaptation coefficients to generate the foreground estimate of the echoed signal; prewhitens the foreground transmit signal by using the received linear prediction coefficients; and generates the adaptation coefficients by cross correlating the received residual signal with the prewhitened foreground transmit signal and adding the product of said cross correlation to the adaptation coefficients used for generating the foreground estimate of the echoed signal.

28 Claims, 2 Drawing Figures

LINEAR PREDICTIVE ECHO CANCELLER INTEGRATED WITH RELP VOCODER

BACKGROUND OF THE INVENTION

The present invention generally pertains to echo cancellation in a two-way communications network and is particularly directed to echo cancellation in a digitized speech signal communication system containing a digital voice codec, such as a RELP vocoder.

Echoes in a communications network are caused when an impedance mismatch in a 4-wire circuit allows the coupling of transmit and receive data paths. In two-way communication networks, it is not uncommon for a received signal to be echoed onto a transmit channel. For example, practical telephone comminications networks use two-wire telephone handsets, which are coupled to four-wire telephone transmission lines by conversion hardware that sometimes is not properly impedance matched; and in such instances an echo return loss (ERL) in the range of 6 to 12 dB is typical. As a result, with a voice input/output communication system, such as a telephone network, in which an echoed signal is produced, a person may hear an echo of his own speech if the round-trip delay incident to the return of the echoed signal is significant, such as greater than 40 msec. In conventional telephone networks, echo cancellation is required only for long-haul trunks where significant transmission delays are present.

However, with the advent of communications networks in which digitized voice signals are produced and transmitted through utilization of digital voice codecs and speech compressors, the round-trip transmission delays become more significant over even relatively short geographical distances when the transmission is at a relatively low bit rate, such as less than 16 Kbps, whereby echo cancellation is required.

A classical echo canceller for a communications network, such as a telephone network, is described in a publication by M. Sondi and D. Berkley, "Silencing Echoes on the Telephone Network", Proc. IEEE, 1980, pp. 948-63. This echo canceller sythesizes an estimate of the echoed signal and subtracts the estimate from the combined signal on the transmit channel. The estimate is generated by filtering the received signal that is being echoed with adaptation coefficients. The adaptation coefficients may be generated by an algorithm in which the coefficients are iteratively updated from a correlation of the received signal with the difference of the estimate from the combined signal on the transmit channel.

Although the classical echo canceller works quite well for a white noise source, when the echoed signal is a highly correlated digitzed speech signal, convergence of the estimate with the echoed signal may be too slow to result in effective cancellation. S. Yamamoto et al., "An Adaptive Echo Canceller with Linear Predictor", Trans. IECE Japan, 1979, PP. 851-857, describes a scheme for overcoming this problem; wherein the coefficients derived from the received digitized speech signal for use in generating the adaptation coefficients are generated by the technique of prewhitening the received speech signal with linear prediction coefficients derived from the received speech signal in order to decorrelate the speech-representive components. This technique provides better convergence.

Echo cancellers must also be able to adjust for false adaptation which occurs when both transmit and receive speech signals occur simultaneously. This condition is known as "double talk." K. Ochiai et al., "Echo Canceller with Two Echo Path Models", IEEE Trans. COM-25, 1977, pp. 589-595 describes a system for overcoming false adaptation caused by double talk; wherein foreground and background estimates of the echo signal are generated separately and the parameter values used for generating the foreground estimate are refreshed by the parameter values used for generating the background estimate when a control logic circuit determines that the background estimate is providing a better approximation of the echo path transfer characteristics.

SUMMARY OF THE INVENTION

The present invention provides an improved echo cancellation system and method for a communications network in which a received digitized speech signal is echoed onto a transmit channel and combined with an input transmit signal.

In accordance with one aspect of the invention, the echo cancellation system includes means for generating a foreground transmit signal by subtracting a foreground estimate of the echoed signal from the combined signal and means for providing the foreground transmit signal on the transmission line for transmission, wherein the foreground estimate is generated by filtering the received digitized speech signal with adaptation coefficients that are generated by cross correlating a prewhitened received digitized speech signal with a prewhitened foreground transmit signal and adding the product of said cross correlation to the adaptation coefficients used for generating the foreground estimate of the echo signal. The system further includes means for generating a background transmit signal by subtracting a background estimate of the echoed signal from the combined signal; means for filtering the received digitized speech signal with adaptation coefficients to generate the background estimate of the echoed signal; means for generating the adaptation coefficients that are used to generate the background estimate of the echoed signal by cross correlating the prewhitened received digitized speech signal with the prewhitened foreground transmit signal and adding the product of said cross correlation to the adaptation coefficients used for generating the foreground estimate of the echoed signal; and means for updating the adaptation coefficients that are used to generate the foreground estimate of the echoed signal with the adaption coefficients that are used to generate the background estimate of the echo signal whenever the energy of the background transmit signal is less than a predetermined factor of the energy of the foreground transmit signal, the energy of the background transmit signal is less than a predetermined factor of the energy of the combined signal, the energy of the combined signal is less than the energy of the received digitized speech signal, and the energy of the received digitized speech signal is greater than a predetermined level.

In accordance with another aspect of the present invention, an echo cancellation system and method are adapted for use in a communications network in which a digitized speech signal sythesized by a residual excited linear predictive (RELP) vocoder from a residual signal received with linear prediction coefficients is echoed onto a transmit channel and combined with a transmitted digitized speech input signal that is to be analyzed by a RELP vocoder for transmission. Such echo cancellation system includes means for generating a foreground transmit signal by subtracting a foreground estimate of the echoed signal from the combined signal; means for prewhitening the foreground transmit signal; means for filtering the received digitized speech signal with adaptation coefficients to generate the foreground estimate of the echoed signal; means for generating the adaptation coefficients by cross correlating the received residual signal with the prewhitened foreground transmit signal and adding the product of said cross correlation to the adaptation coefficients used for generating the foreground estimate for the echoed signal; and means for providing the foreground transmit signal on the transmit channel for RELP analysis. In contrast to the other aspect of the present invention discussed above, the use of the residual signal received by the RELP sythesizer obviates the necessity of prewhitening the received digitized speech signal sythesized by the RELP vocoder; and the received linear prediction coefficients conveniently may be used to prewhiten the foreground transmit signal for use in generating the adaptation coefficients.

Additional features of the present invention are described with reference to the description of the preferred embodiments.

DESCRIPTION OF THE PREFERRED EMBODIMENTS

Figure 1:
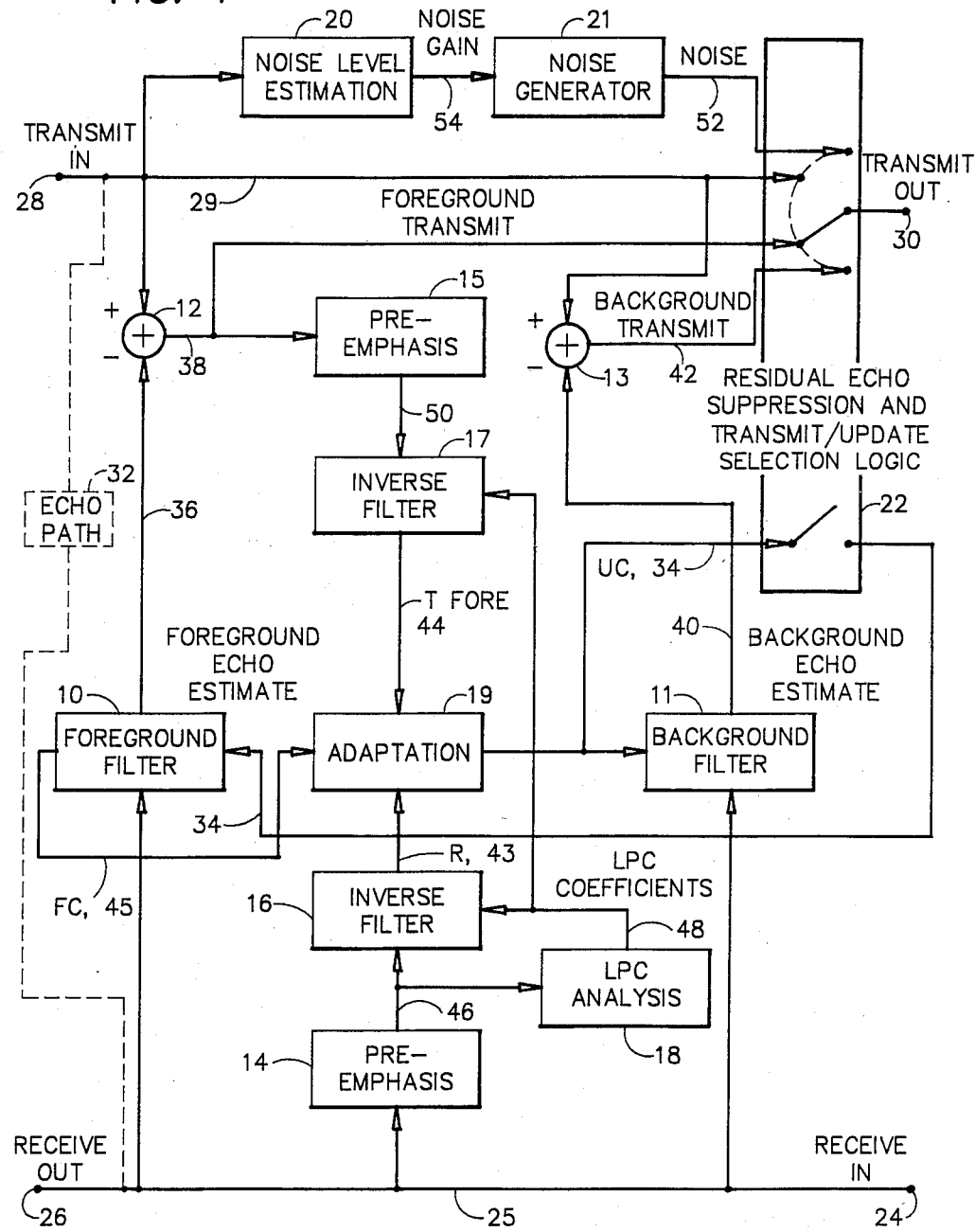
FIG. 1 is a functional block diagram of a preferred embodiment of the echo canceller of the present invention.

In its preferred embodiments, the echo canceller system of the present invention is implemented as functional units in a digital signal processor, such as a Texas Instruments Model TMS32020 Digital Signal Processor. Referring to FIG. 1, in a general purpose embodiment, the echo canceller includes a foreground filter 10, a background filter 11, a first subtraction unit 12, a second subtraction unit 13, a first preemphasis unit 14, a second preemphasis unit 15, a first inverse filter 16, a second inverse filter 17, a linear predictive coefficient (LPC) analysis unit 18, an adaptation unit 19, a noise level estimation unit 20, a noise generator 21 and a residual echo suppression and transmit/update selection logic unit 22.

The echo canceller is implemented in a two-way communications network in which a received digitized speech signal is input at terminal 24 onto a receive channel 25 and output at terminal 26, and in which a transmitted digitized speech signal is input at terminal 28 onto a transmit channel 29 and output at terminal 30. The echo canceller cancels signals that are received on the receive channel 25 and echoed onto the transmit channel 29 by the echo path 32 and combined with a transmit signal input at terminal 28.

The foreground filter 10 generates a foreground estimate of the echo of the received digitized speech signal on the transmit channel 29 by filtering the received signal with a set of n updated adaptation coefficients UC, 34, provided by the adaptation unit 19 when certain conditions prevail, as determined by the logic unit 22. Such conditions will be discussed below. The foreground echo estimate 36 is provided to the subtraction unit 12, which subtracts the foreground echo estimate 36 from the combined signal on the transmit channel 29 to provide a foreground transmit signal 38. The foreground transmit signal 38 in effect contains an "error signal" component representing any difference between the received signal echoed onto the transmit channel 29 and the foreground echo estimate 36.

The background filter 11 generates a background estimate of the echo of the received digitized speech signal on the transmit channel 29 by filtering the received signal with a set of n updated adaptation coefficients UC, 34, continuously provided by the adaptation unit 19. The background echo estimate 40 is provided to the subtraction unit 13, which subtracts the background echo estimate 40 from the combined signal on the transmit channel 29 to provide a background transmit signal 42. The background transmit signal 42 in effect contains an "error signal" component representing any difference between the received signal echoed onto the transmit channel 29 and the background echo estimate 40.

Both the foreground filter 10 and the background filter 11 are finite impulse response (FIR) filters in order to provide a stable system.

The adaptation unit 19 generates each set of n adaptation coefficients UC, 34, by cross correlating a prewhitened received digitized speech signal R, 43, with a prewhitened foreground transmit signal T FORE, 44, and adding the product of said cross correlation to the adaptation coefficients FC, 45, that are used by the foreground filter 10 for generating the foreground echo estimate 36 subtracted from the combined signal on the transmit channel 29 to generate the foreground transmit signal 38 from which the cross correlation product is derived. The adaptation coefficients are generated in accordance with the following algorithm, wherein a block of l prewhitened foreground transmit signal samples T FONE are cross correlated with a block l prewhitened received digitized speech signal samples R.

$$UC(n) = FC(n) + k \sum_{i=1}^{l} [T\,\text{Fore}(i) * R(i - n)] \quad \text{(Eq. 1)}$$

UC(n) is the n'th coefficient of the updated adaptation coefficients.

FC(n) is the n'th coefficient used by the foreground filter 10.

T FORE (i) is the i'th prewhitened foreground transmit signal sample.

R(i) is the i'th prewhitened received digitized speech signal sample.

k is a normalization factor proportioned to the inverse of the summation of the square of R(i).

Cross correlation of blocks of signal samples results in better noise rejection. In the preferred embodiment, 180 samples are cross correlated in each block.

The received digitized speech signal from receive channel 25 is prewhitened by a combination of the first preemphasis unit 14 and the first inverse filter 16. The first preemphasis unit 14 preemphasizes the received speech signal to emphasize high frequency speech components and provides a premphasized received signal 46. The LPC analysis unit 18 generates linear prediction coefficients 48 from the preemphasized speech signal 46. The first inverse filter 16 generates the prewhitened received signal R by inverse filtering the preemphasized signal 46 with the linear prediction coefficients 48.

The foreground transmit signal 38 is prewhitened by a combination of the second preemphasis unit 15 and the second inverse filter 17. The second preemphasis unit 15 preemphasizes the foreground transmit signal 38 to emphasize high frequency speech components and a provides a preemphasized foreground transmit signal 50. The second inverse filter 17 generates the prewhitened foreground transmit signal T FORE, 44, by inverse filtering the preemphasized foreground transmit signal 50 with the linear prediction coefficients 48.

The noise generator 21 generates a noise signal 52 approximating the background noise energy level of the transmit channel 29 when no signal is present thereon. The noise signal 52 is a psuedo random number sequence provided in accordance with a noise gain signal 54 provided by the noise level estimation unit 20. The noise level estimation unit 20 distinguishes background noise from conversation and provides the noise gain signal 54 for activating the noise generator 21 only when the average energy level of the signals on the transmit channel 29 falls between a predetermined minimum and a predetermined maximum. The minimum is an empirical estimate of the minimum useful noise amplitude; and the maximum is an empirical estimate of the energy level at which the signal on the transmission channel 29 becomes so high as to be disturbing. The hoise gain signal 54 represents a noise level amplitude that is estimated by summing a predetermined fraction of the last estimated amplitude with the product of the average amplitude of the signals on transmit channel 29 when no signal is present thereon times the complement of the predetermined fraction.

The residual echo suppression and transmit/update selection logic unit 22 determines when an updated set of adaptation coefficients UC is provided to the foreground filter 10 and which of the signals is to be provided to the transmit out terminal 30 in accordance with certain prescribed conditions. A new set of updated coefficients UC are provided to the foreground filter 10 whenever the energy of the background transmit signal 42 is less than a predetermined factor A of the energy of the foreground transmit signal 38, the energy of the background transmit signal 42 is less than a predetermined factor B of the energy of the combined signal on the transmit channel 29, the energy of combined signal on the transmit channel 29 is less than the energy of the received digitized speech signal on receive channel 25, and the energy of the received digitized speech signal is greater than a predetermined level E. In the preferred embodiment the factor A is 7/8, the factor B is 1 and the predetermined energy level E is approximately 2 to the minus tenth power. These energy levels are determined over each block of 1 samples. When this set of prescribed conditions prevails, the logic circuit 22 selectively provides the background transmit signal 42 to the transmit out terminal 30 of the transmit channel 29 for transmission in lieu of the foreground transmit signal 38.

The logic circuit 22 selectively provides the noise signal 52 to the transmit out terminal 30 of the transmit channel 29 for transmission in lieu of the foreground transmit signal 38 when the energy of the foreground transmit signal 38 is less than a predetermined fraction of the energy of the received digitized speech signal on the receive channel 25. In the preferred embodiment this predetermined fraction is 2 to the minus seventh power, whereby the approximate energy level difference is 21 dB.

The logic circuit 22 also selectively provides the noise signal 52 to the transmit out terminal 30 of the transmit channel 29 for transmission in lieu of the background transmit signal 42 when the energy of the background transmit signal 42 is less than a predetermined fraction of the energy of the received digitized speech signal on the receive channel 25. In the preferred embodiment this predetermined fraction is 2 to the minus seventh power, whereby the approximate energy level difference is 21 dB.

The logic circuit 22 selectively provides the combined signal on the transmit channel 29 to the transmit out terminal 30 in lieu of the foreground transmit signal 38 and resets the coefficients in the foreground filter 10 to zero when the energy of the foreground transmit signal 38 exceeds the energy of the combined signal on the tranmission channel 29 by a predetermined amount. By this technique any residual echo that causes oscillation is suppressed. In the preferred embodiment the predetermined amount is 100 percent.

Figure 2:
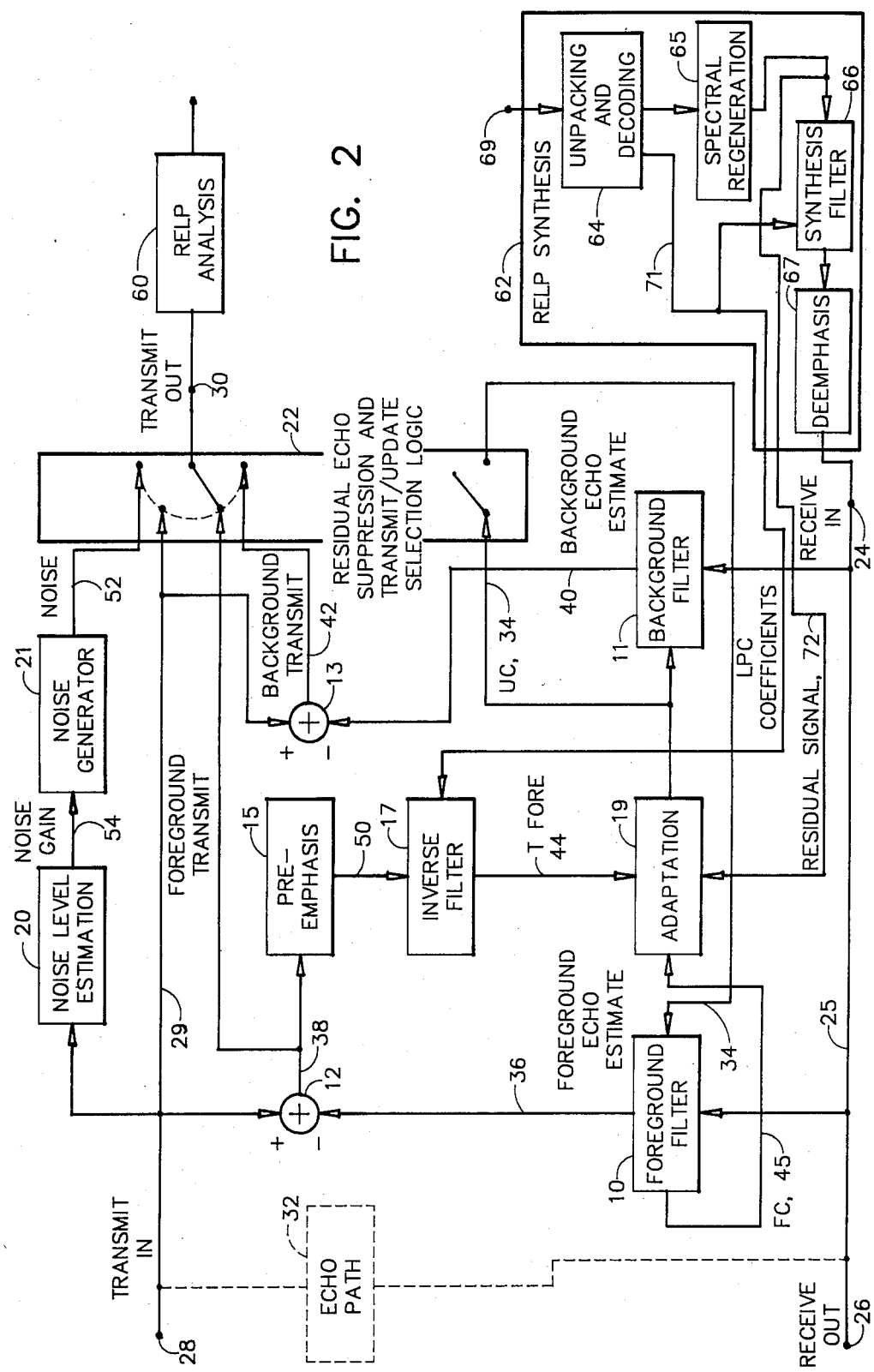
FIG. 2 is a functional block diagram of a preferred embodiment of an echo canceller according to the present invention adapted for use in a communication network including a RELP vocoder.

Referring to FIG. 2 a preferred embodiment of the echo canceller of the present invention is integrated with a RELP vocoder in a two-way communications network in which a received digitized speech signal synthesized by the RELP vocoder is echoed onto a transmit channel and combined with a transmitted digitized speech input signal that is to be analyzed by the RELP vocoder for transmission. The echo canceller is the same as that described with reference to FIG. 1, except for the elimination of the first preemphasis unit 14, the first inverse filter 16 and the LPC analysis unit 18; the like reference numerals are used to refer to functional units and signals that are common to the embodiments of both FIGS. 1 and 2.

The RELP vocoder includes a RELP analysis unit 60 and a RELP synthesis unit 62, both of which are implemented by the digital signal processor that implements the echo canceller. The RELP synthesis unit 62 includes an unpacking and decoding unit 64, a spectral regeneration unit 65, a synthesis filter 66 and a deemphasis unit 67. A signal 69 generated by a RELP analysis unit is received and processed by the RELP synthesis unit to provide a received digitized speech signal on the receive channel 25. The RELP vocoder is more fully described in International Patent Application No. WO86/02726 published May 9, 1986.

In integrating the echo canceller of the present invention with the RELP vocoder, advantageous use is made of linear prediction coefficients 71 provided by the unpacking and decoding unit 64 and a residual signal 72 provided by the spectral regeneration unit 65. Since the residual signal 72 is already a prewhitened representation of the received digitized speech signal on the receive channel 29, there is no need to separately prewhiten the received digitized speech signal, as in the echo canceller embodiment of FIG. 1. Also the received linear prediction coefficients 71 are used to inversely filter the preemphasized foreground transmit signal 50, thereby making it possible to eliminate the LPC analysis unit 18 of FIG. 1.

In the integrated system of the FIG. 2, the adaptation unit 19 generates each set of n adaptation coefficient UC, 34, by cross correlating the residual signal 72 with the prewhitened foreground transmit signal T FORE, 45, and adding the product of said cross correlation to the adaptation coefficients FC, 45, that are used by the foreground filter for generating the foreground echo estimate 36. Equation 1, above, defines the generation coefficients, with the proviso that R(i) is the i'th residual signal sample instead of the i'th prewhitened received digitized speech signal sample, as in the echo canceller of FIG. 1.

The signals selectively provided to transmit out terminal 30 of the transmit channel 29 in the embodiment of FIG. 2 are provided to the RELP analysis unit 60 for RELP analysis.

The echo canceller of the present invention is particularly compatible for integration with a RELP vocoder inasmuch as both process blocks of signals, whereby the integrated processing can readily be synchronized.

We claim:

1. In a two-way communications network, in which a received digitized speech signal is echoed onto a transmit channel and combined with an input transmit signal, a system for cancelling the echoed signal from the transmit channel, comprising
    means for prewhitening the received digitized speech signal;
    means for generating a foreground transmit signal by subtracting a foreground estimate of the echoed signal from the combined signal;
    means for prewhitening the foreground transmit signal;
    means for filtering the received digitized speech signal with adaptation coefficients to generate the foreground estimate of the echoed signal;
    means for providing the foreground transmit signal on the transmit channel for transmission;
    means for generating a background transmit signal by subtracting a background estimate of the echoed signal from the combined signal;
    means for filtering the received digitized speech signal with adaptation coefficients to generate the background estimate of the echoed signal;
    means for generating the adaptation coefficients that are used to generate the background estimate of the echoed signal by cross correlating the prewhitened received digitized speech signal with the prewhitened foreground transmit signal and adding the product of said cross correlation to the adaptation coefficients used for generating the foreground estimate of the echoed signal; and
    means for updating the adaptation coefficients that are used to generate the foreground estimate of the echoed signal with the adaption coefficients that are used to generate the background estimate of the echo signal whenever the energy of the background transmit signal is less than a predetermined factor of the energy of the foreground transmit signal, the energy of the background transmit signal is less than a predetermined factor of the energy of the combined signal, the energy of the combined signal is less than the energy of the received digitized speech signal, and the energy of the received digitized speech signal is greater than a predetermined level.

2. A system according to claim 1, wherein the means for generating the adaptation coefficients comprises means for cross correlating a block of prewhitened received digitized signals with a block of prewhitened foreground transmit signals.

3. A system according to claim 1, further comprising
    means for generating a noise signal approximating the background noise level of the transmit channel when no signal is present thereon; and
    means for selectively providing the noise signal on the transmit channel for transmission in lieu of the foreground transmit signal when the energy of the foreground transmit signal is less than a predetermined fraction of the energy of the received digitized speech signal.

4. A system according to claim 1, further comprising
    means for selectively providing the background transmit signal on the transmit channel for transmission in lieu of the foreground transmit signal when the conditions for updating the adaptation coefficients used to generate the foreground estimate of the echoed signal prevail;
    means for generating a noise signal approximating the background noise level of the transmit channel when no signal is present thereon; and
    means for selectively providing the noise signal on the transmit channel for transmission in lieu of the background transmit signal when the energy of the background transmit signal is less than a predetermined fraction of the energy of the received digitized speech signal.

5. A system according to claim 1, further comprising
    means for resetting the coefficients used for filtering the received digitized speech signal to generate the foreground estimate of the echoed signal to zero and for selectively providing the input transmit signal on the transmit channel for transmission in lieu of the foreground transmit signal when the energy of the foreground transmit signal exceeds the energy of the input transmit signal by a predetermined amount.

6. A system according to claim 1, wherein
    the means for prewhitening the received digitized speech signal comprises
    means for preemphasizing the received digitized speech signal to emphasize high frequency speech components; and
    means for inverse filtering the preemphasized received digitized speech signal with linear prediction coefficients related to the received digitized speech signal; and
    the means for prewhitening the foreground transmit signal comprises
    means for preemphasizing the foreground transmit signal to emphasize high frequency speech components; and
    means for inverse filtering the preemphasized foreground transmit signal with linear prediction coefficients related to the received digitized speech signal.

7. A system according to claim 1, wherein the means for filtering the received digitized speech signal to generate the foreground estimate of the echoed signal comprises a finite impulse response filter.

8. In a two-way communications network, in which a received digitized speech signal synthesized by a RELP vocoder from a residual signal received with linear prediction coefficients is echoed onto a transmit channel and combined with a transmitted digitized speech input signal that is to be analyzed by a RELP vocoder for transmission, a system for cancelling the echoed signal from the transmit channel, comprising
    means for generating a foreground transmit signal by subtracting a foreground estimate of the echoed signal from the combined signal;
    means for prewhitening the foreground transmit signal;

means for filtering the received digitized speech signal with adaptation coefficients to generate the foreground estimate of the echoed signal;

means for generating the adaptation coefficients by cross correlating the received residual signal with the prewhitened foreground transmit signal and adding the product of said cross correlation to the adaptation coefficients used for generating the foreground estimate of the echoed signal; and means for providing the foreground transmit signal on the transmit channel for RELP analysis.

9. A system according to claim 8, further comprising means for generating a background transmit signal by subtracting a background estimate of the echoed signal from the combined signal;

means for filtering the received digitized speech signal with said adaptation coefficients that are updated by the cross correlation product to generate the background estimate of the echoed signal; and means for updating the adaptation coefficients that are used to generate the foreground estimate of the echoed signal with the adaption coefficients that are used to generate the background estimate of the echo signal whenever the energy of the foreground transmit signal is less than a predetermined factor of the energy of the foreground transmit signal, the energy of the background transmit signal is less than a predetermined factor of the energy of the combined signal, the energy of the combined signal is less than the energy of the received digitized speech signal, and the energy of the received digitized speech signal is greater than a predetermined level.

10. A system according to claim 9, further comprising means for selectively providing the background transmit signal on the transmit channel for transmission in lieu of the foreground transmit signal when the conditions for updating the adaptation coefficients used to generate the foreground estimate of the echoed signal prevail;

means for generating a noise signal approximating the background noise level of the transmit channel when no signal is present thereon; and means for selectively providing the noise signal on the transmit channel for RELP analysis in lieu of the background transmit signal when the energy of the background transmit signal is less than a predetermined fraction of the energy of the received digitized speech signal.

11. A system according to claim 8, further comprising means for generating a noise signal approximating the background noise level of the transmit channel when no signal is present thereon; and means for selectively providing the noise signal on the transmit channel for RELP analysis in lieu of the foreground transmit signal when the energy of the foreground transmit signal is less than a predetermined fraction of the energy of the received digitized speech signal.

12. A system according to claim 8, further comprising means for resetting the coefficients used for filtering the received digitized speech signal to generate the foreground estimate of the echoed signal to zero and for selectively providing the input transmit signal on the transmit channel for RELP analysis in lieu of the foreground transmit signal when the energy of the foreground transmit signal exceeds the energy of the input transmit signal by a predetermined amount.

13. A system according to claim 8, wherein the means for prewhitening the foreground transmit signal comprises means for preemphasizing the foreground transmit signal to emphasize high frequency speech components; and means for inverse filtering the preemphasized foreground transmit signal with the received linear prediction coefficients.

14. A system according to claim 8, wherein the means for filtering the received digitized speech signal to generate the foreground estimate of the echoed signal comprises a finite impulse response filter.

15. A system according to claim 8, wherein the means for generating the adaptation coefficients comprises means for cross correlating a block of residual signals with a block of prewhitened foreground transmit signals.

16. In a two-way communications network, in which a received digitized speech signal is echoed onto a transmit channel and combined with an input transmit signal, a method of cancelling the echoed signal from the transmit channel, comprising the steps of (a) prewhitening the received digitized speech signal;

(b) generating a foreground transmit signal by subtracting a foreground estimate of the echoed signal from the combined signal;

(c) prewhitening the foreground transmit signal;

(d) filtering the received digitized speech signal with adaptation coefficients to generate the foreground estimate of the echoed signal;

(e) providing the foreground transmit signal on the transmit channel for transmission;

(f) generating a background transmit signal by subtracting a background estimate of the echoed signal from the combined signal;

(g) filtering the received digitized speech signal with adaptation coefficients to generate the background estimate of the echoed signal;

(h) generating the adaptation coefficients that are used to generate the background estimate of the echoed signal by cross correlating the prewhitened received digitized speech signal with the prewhitened foreground transmit signal and adding the product of said cross correlation to the adaptation coefficients used for generating the foreground estimate of the echoed signal; and (i) updating the adaptation coefficients that are used to generate the foreground estimate of the echoed signal with the adaption coefficients that are used to generate the background estimate of the echo signal whenever the energy of the background transmit signal is less than a predetermined factor of the energy of the foreground transmit signal, the energy of the background transmit signal is less than a predetermined factor of the energy of the combined signal, the energy of the combined signal is less than the energy of the received digitized speech signal, and the energy of the received digitized speech signal is greater than a predetermined level.

17. A method according to claim 16, further comprising the steps of (j) generating a noise signal approximating the background noise level of the transmit channel when no signal is present thereon; and (k) selectively providing the noise signal on the transmit channel for transmission in lieu of the foreground transmit signal when the energy of the foreground transmit signal is less than a predetermined fraction of the energy of the received digitized speech signal.

18. A method according to claim 16, further comprising the steps of
(j) selectively providing the background transmit signal on the transmit channel for transmission in lieu of the foreground transmit signal when the conditions for updating the adaptation coefficients used to generate the foreground estimate of the echoed signal prevail;
(k) generating a noise signal approximating the background noise level of the transmit channel when no signal is present thereon; and
(l) selectively providing the noise signal on the transmit channel for transmission in lieu of the background transmit signal when the energy of the background transmit signal is less than a predetermined fraction of the energy of the received digitized speech signal.

19. A method according to claim 16, further comprising the step of
(j) resetting the coefficients used for filtering the received digitized speech signal to generate the foreground estimate of the echoed signal to zero and selectively providing the input transmit signal on the transmit channel for transmission in lieu of the foreground transmit signal when the energy of the foreground transmit signal exceeds the energy of the input transmit signal by a predetermined amount.

20. A method according to claim 16, wherein
step (a) comprises the steps of
(j) preemphasizing the received digitized speech signal to emphasize high frequency speech components; and
(k) inverse filtering the preemphasized received digitized speech signal with linear prediction coefficients related to the received digitized speech signal; and
step (c) comprises the steps of
(l) preemphasizing the foreground transmit signal to emphasize high frequency speech components; and
(m) inverse filtering the preemphasized foreground transmit signal with linear prediction coefficients related to the received digitized speech signal.

21. A method according to claim 16, wherein step (h) comprises the step of
(j) cross correlating a block of prewhitened received digitized speech signals with a block of prewhitened foreground transmit signals.

22. In a two-way communications network, in which a received digitized speech signal synthesized by a RELP vocoder from a residual signal received with linear prediction coefficients is echoed onto a transmit channel and combined with a transmitted digitized speech input signal that is to be analyzed by a RELP vocoder for transmission, a method of cancelling the echoed signal from the transmit channel, comprising the steps of
(a) generating a foreground transmit signal by subtracting a foreground estimate of the echoed signal from the combined signal;
(b) prewhitening the foreground transmit signal;
(c) filtering the received digitized speech signal with adaptation coefficients to generate the foreground estimate of the echoed signal;
(d) generating the adaptation coefficients by cross correlating the received residual signal with the prewhitened foreground transmit signal and adding the product of said cross correlation to the adaptation coefficients used for generating the foreground estimate of the echoed signal; and
(e) providing the foreground transmit signal on the transmit channel for RELP analysis.

23. A method according to claim 22, further comprising the steps of
(f) generating a background transmit signal by subtracting a background estimate of the echoed signal from the combined signal;
(g) filtering the received digitized speech signal with said adaptation coefficients that are updated by the cross correlation product to generate the background estimate of the echoed signal; and
(h) updating the adaptation coefficients that are used to generate the foreground estimate of the echoed signal with the adaption coefficients that are used to generate the background estimate of the echo signal whenever the energy of the background transmit signal is less than a predetermined factor of the energy of the foreground transmit signal, the energy of the background transmit signal is less than a predetermined factor of the energy of the combined signal, the energy of the combined signal is less than the energy of the received digitized speech signal, and the energy of the received digitized speech signal is greater than a predetermined level.

24. A method according to claim 23, further comprising the steps of
(i) selectively providing the background transmit signal on the transmit channel for transmission in lieu of the foreground transmit signal when the conditions for updating the adaptation coefficients used to generate the foreground estimate of the echoed signal prevail;
(j) generating a noise signal approximating the background noise level of the transmit channel when no signal is present thereon; and
(k) selectively providing the noise on the transmit channel for RELP analysis in lieu of the background transmit signal when the energy of the background transmit signal is less than a predetermined fraction of the energy of the received digitized speech signal.

25. A method according to claim 22, further comprising the steps of
(f) generating a noise signal approximating the background noise level of the transmit channel when no signal is present thereon; and
(g) selectively providing the noise signal on the transmit channel for RELP analysis in lieu of the foreground transmit signal when the energy of the foreground transmit signal is less than a predetermined fraction of the energy of the received digitized speech signal.

26. A method according to claim 22, further comprising the step of
(f) resetting the coefficients used for filtering the received digitized speech signal to generate the foreground estimate of the echoed signal to zero and selectively providing the input transmit signal on the transmit channel for RELP analysis in lieu of the foreground transmit signal when the energy of the foreground transmit signal exceeds the energy of the input transmit signal by a predetermined amount.

27. A method according to claim 22, wherein step (b) comprises the steps of (f) preemphasizing the foreground transmit signal to emphasize high frequency speech components; and (g) inverse filtering the preemphasized foreground transmit signal with the received linear prediction coefficients.

28. A method according to claim 22, wherein step (d) comprises the step of (f) cross correlating a block of residual signals with a block of prewhitened foreground transmit signals.

* * * * *